(12) United States Patent
Mykytiuk

(10) Patent No.: US 12,179,232 B2
(45) Date of Patent: Dec. 31, 2024

(54) SYSTEM AND METHOD FOR IMPREGNATING A POROUS SURFACE WITH ANTIBACTERIAL AND ANTIVIRAL COMPOUNDS

(71) Applicant: Unique Equipment Solutions LLC, Littleton, MA (US)

(72) Inventor: Oleksandr Yuriiovych Mykytiuk, Kyiv (UA)

(73) Assignee: Unique Equipment Solutions LLC, Littleton, MA (US)

( * ) Notice: Subject to any disclaimer, the term of this patent is extended or adjusted under 35 U.S.C. 154(b) by 135 days.

(21) Appl. No.: 17/243,524

(22) Filed: Apr. 28, 2021

(65) Prior Publication Data

US 2021/0402433 A1    Dec. 30, 2021

Related U.S. Application Data

(60) Provisional application No. 63/017,124, filed on Apr. 29, 2020.

(51) Int. Cl.

| | |
|---|---|
| *B05D 5/00* | (2006.01) |
| *A01N 59/16* | (2006.01) |
| *A01N 59/20* | (2006.01) |
| *B05D 1/02* | (2006.01) |
| *B05D 1/18* | (2006.01) |

(52) U.S. Cl.
CPC .............. *B05D 5/00* (2013.01); *A01N 59/16* (2013.01); *A01N 59/20* (2013.01); *B05D 1/02* (2013.01); *B05D 1/18* (2013.01)

(58) Field of Classification Search
CPC ......... A01N 59/20; A01N 25/04; A01N 25/24
See application file for complete search history.

(56) References Cited

U.S. PATENT DOCUMENTS

| | | | |
|---|---|---|---|
| 2007/0003603 A1 | 1/2007 | Karandikar | |
| 2011/0206753 A1 | 8/2011 | Karpov | |
| 2012/0183674 A1 | 7/2012 | Bonn-Savage | |
| 2020/0206264 A1* | 7/2020 | Abbott | .................. A61K 33/34 |

FOREIGN PATENT DOCUMENTS

| | | |
|---|---|---|
| CN | 102197825 A | 9/2011 |
| UA | 28910 | 12/2007 |
| WO | 2012017446 A2 | 2/2012 |

OTHER PUBLICATIONS

DeAlba-Montero et al., Bioinorganic Chemistry and Applications, 2017, 6 pages.*
Lin et al., Wat Res vol. 30, 8, 1996, 1905-1913.*
https://energyeducation.ca/encyclopedia/Dopant, 3 pages, 2014.*
G. Kampf, D. Todt, S. Pfaender, E. Steinmann. Persistence of coronaviruses on inanimate surfaces and their inactivation with biocidal agents vol. 104, Issue 3, p. 246-251, Mar. 1, 2020 Published: Feb. 6, 2020.
Van Doremalen, et al. van Doremalen N, Bushmaker T, Morris DH, et al. Aerosol and surface stability of SARS-CoV-2 as compared with SARS-CoV-1. N Engl J Med. Published online Mar. 17, 2020.

* cited by examiner

*Primary Examiner* — Kyle A Purdy
(74) *Attorney, Agent, or Firm* — Loginov & Associates, PLLC; William A. Loginov (57) ABSTRACT

This invention provides a system and method for impregnating surfaces, which are typically porous and/or textile-based, with antiviral/antibacterial compounds in a manner that is robust, effective and straightforward. Such techniques can be employed during manufacture of the underlying item (e.g. PPE) and/or in the field. In an illustrative embodiment, a system and method for providing antiviral and antibacterial properties to a porous surface is provided. It includes a suspension consisting of a water-based solvent and an active ingredient consisting of at least one of a nanoparticulate metal and a chelated metal. The suspension is applied using an application process that immerses or sprays the suspension relative to the surface. Illustratively, the metal is at least one of silver, copper and titanium. Alternatively, or additionally, the metal can a chelated copper. The suspension can also include a salt component, such as sodium chloride. Additionally, the suspension can include a water repellant.

12 Claims, 5 Drawing Sheets

```
┌─────────────────────────────────────────────────────┐    500
│ PROVIDE SUSPENSION TO SPRAYER SUFFICIENT TO COVER A │   ───
│ PREDETERMINED AREA OF MATERIAL (ITEM)   510         │
└─────────────────────────────────────────────────────┘
                         ▼
┌─────────────────────────────────────────────────────┐
│ SPRAY SURFACE OF ITEM WITH PREDETERMINED QUANTITY   │
│ OF SUSPENSION TO COVER AREA              520        │
└─────────────────────────────────────────────────────┘
                         ▼
┌─────────────────────────────────────────────────────┐
│ ALLOW SUSPENSION TO DRY ON SURFACE OF ITEM USING    │
│ AMBIENT AIR EVAPORATION AND/OR EXTERNAL             │
│ HEAL/AIRFLOW SOURCE                      530        │
└─────────────────────────────────────────────────────┘
                         ▼
         NO          ◇ SUFFICIENT ◇
         ◀───────────  COATING? 540
                         │ YES
                         ▼
┌─────────────────────────────────────────────────────┐
│ ASSEMBLE COATED MATERIAL INTO AN ITEM AND/OR DEPLOY │
│ COATED ITEM FOR USE                      550        │
└─────────────────────────────────────────────────────┘
```

Fig. 5

SYSTEM AND METHOD FOR IMPREGNATING A POROUS SURFACE WITH ANTIBACTERIAL AND ANTIVIRAL COMPOUNDS

RELATED APPLICATION

This application claims the benefit of U.S. Patent Provisional Application Ser. No. 63/017,124, entitled SYSTEM AND METHOD FOR IMPREGNATING A POROUS SURFACE WITH ANTIBACTERIAL AND ANTIVIRAL COMPOUNDS, filed Mar. 29, 2020, the teachings of which are expressly incorporated herein by reference.

FIELD OF THE INVENTION

This invention relates to production and application of antibacterial and antiviral compounds to material surfaces, such as those employed in the construction of personal protective equipment (PPE).

BACKGROUND OF THE INVENTION

Human coronavirus (referred to herein as "HCoV"), has emerged as a significant threat to world health, and is responsible for the current pandemic of 2020. Like many contagious virus strains, HCoV is released from an infected person as an aerosol during breathing, coughing, sneezing, blowing of his or her nose, or just touching the face. Such aerosolized viruses thereby spread through the air, remaining in air for hours. Such viruses may also adhere to various surfaces, including those that make up PPE components, including but not limited to, masks, gloves, gowns, hazmat suits, etc. As the virus can remain active for some time (hours or even days) on surfaces, they pose a continuing risk to non-infected persons, including patients, health care workers and bystanders. Those active viruses can infect non-infected persons through inhalation of the aerosolized form, or through hand/finger contact with viruses on a surface, and subsequent transfer to a mucous membrane, mouth or other orifice via the hand/finger.

In a health care environment the continuing contamination (via exposure to biological materials, bacterial, viruses, etc.) leads to a requirement that PPE be changed-out frequently. This helps to maintain its efficacy and to comply with health regulations and/or other standards of care. However, the practice of frequent PPE change-outs can generate a large volume of hazardous medical waste as such equipment (often bulky) must be disposed. Likewise, the frequency of change-out also consumes a mass quantity of PPE that (in a sufficiently large epidemic) can lead to critical shortages.

Available published data as to the latency of infectious activity for HCoV remaining in aerosol form, and/or on a surface, under simulated healthcare conditions by applying viruses to multiple surfaces maintained at 21° C. to 23° C. and 40% relative humidity stands at over 7 days. All experimental measurements are reported as mean across 327 repetitions of the experiment. 28 29 HCoV-19 remained viable in aerosols throughout the duration of experiment (3 hours) with a 30 reduction in infectious titer from 103.5 to 102.7 TCID50/L, similar to the reduction observed for SARS-CoV-31 1, from 104.3 to 103.5 TCID50/mL. 32 HCoV-19 was most stable on plastic and stainless steel and viable virus could be detected up to 33-72 hours post application, though the virus titer was greatly reduced (plastic from 103.7 to 34 100.6 TCID50/mL after 72 hours, stainless steel from 103.7 to 100.6 TCID50/mL after 48 hours). SARS-CoV-35 1 had similar stability kinetics (polypropylene from 103.4 to 100.7 TCID50/mL after 72 hours, stainless steel 36 from 103.6 to 100.6 TCID50/mL after 48 hours). No viable virus could be measured after 4 hours on copper 37 for HCoV-19 and 8 hours for SARS-CoV-1, or after 24 hours on cardboard for HCoV-19 and 8 hours for 38 SARS-CoV-1.

Available published data demonstrate that a surface, including those used in PPE materials, can be efficiently inactivated by surface disinfection procedures with 62-71% ethanol, 0.5% hydrogen peroxide or 0.1% sodium hypochlorite within approximately 1 minute. Other biocidal agents such as 0.05-0.2% benzalkonium chloride or 0.02% chlorhexidine digluconate are less effective. By way of background information, see G. Kampf, D. Todt, S. Pfaender, E. Steinmann. Persistence of coronaviruses on inanimate surfaces and their inactivation with biocidal agents Volume 104, ISSUE 3, P246-251, Mar. 1, 2020 Published: Feb. 6, 2020 DOI:https://doi.org/10.1016/j.jhin.2020.01.022; van Doremalen, et al. van Doremalen N, Bushmaker T, Morris D H, et al. Aerosol and surface stability of SARS-CoV-2 as compared with SARS-CoV-1. N Engl J Med. Published online Mar. 17, 2020. https://www.nejm.org/doi/full/10.1056/NEJMc2004973. Accessed Mar. 23, 2020.).

EPA-approved disinfection solutions for disinfection of surfaces and usage against the virus that causes COVID-19 are provided in List N: Disinfectants for Use Against SARS-CoV-2. List N solutions includes the following active ingredients: silver, hydrogen peroxide, chlorine dioxide, quaternary ammonium, citric acid, thymol, dodecylbenzenesulfonic acid, lactic acid, ethanol, ethyl alcohol, glycolic acid, hydrochloric acid, ammonium carbonate, ammonium bicarbonate, octanoic acid, peroxyacetic acid, hypochloric acid, isopropanol, L-Lactic acid, phenolic, potassium peroxymonosulfate, sodium chloride, sodium hypochlorite, triethylene glycol.

These disinfectants are able to inactive viruses immediately upon application of disinfectants on surfaces, however, to be effective, these disinfectants should uniformly cover 100% of the contaminated surface area. In areas with less than 100% coverage of disinfectants, living viruses can remain on the surface. Furthermore, after the disinfectants have evaporated, the disinfectants are no longer effective and new viruses that come in contact with the surface will stay active and can infect non-infected people until the surfaces are disinfected again.

In the case of air filters, the filters are sometimes able to trap viruses in the air, with the number of viruses on the air filter surfaces increasing constantly. The viruses can stay active on the air filter and various surfaces throughout the air channels for hours and even days. These contaminated air filters with constantly growing number of live viruses can become a source of infection for non-infected people as the viruses eventually pass completely through the air filter and into the circulating air. An aerosolized disinfectant can be used to kill a portion of the viruses on the surface of an air filter, however, 100% coverage of all surfaces may be difficult or impossible for an air filter, and furthermore, the disinfectant evaporates quickly due to air flow. As soon as the disinfectant evaporates, new viruses will land on, and eventually begin passing through the filter. Using known disinfectants, it is nearly impossible to prevent an air filter from becoming a source of viruses being circulated into the air. In addition, it should be noted that wet air filters have a significantly reduced air flow capacity when compared to the same filters when dry. This reduction in air flow capacity when a filter is wet, along with the complete lack of efficacy of traditional disinfectants after drying, generally means that air filters cannot be effectively disinfected using traditional liquid disinfectants.

A known disinfection method (refer, by way of background, to Ukraine Patent No. UA28910) uses nanoparticles of copper and silver, in a concentration 0.00-1000 mg/1 of silver and 0.1-1000 mg/1 of coper, for water sterilization, for example, in swimming pools. Water-based suspensions of copper and/or silver nanoparticles with various concentrations of copper and/or silver as active ingredients can also be effective at disinfecting surfaces, so long as the surface area is 100% covered, and a minimum density of active ingredients is achieved. In the case of hydrophobic surfaces, uniform 100% coverage of surfaces with water-based disinfectants is not possible. Any significant area of hydrophobic surface is likely to remain without active ingredients, resulting in hydrophobic surfaces that are not properly disinfected.

There are a number of known methods of production of textiles, which have antibacterial properties in a dry condition, which use, as an active ingredient, nanoparticles of silver and different specimens of organic molecules with antibacterial properties. Those active ingredients are impregnated into the textile or incorporated into polymers before the actual textile production (e.g. spinning thread, weaving, etc.).

A number of known methods production of different types of plastics with antibacterial properties in dry environment employ nanoparticles of silver or specific specimens of organic molecules as active ingredients. Active ingredients are impregnated onto/into the surface of plastic or incorporated into the plastic matter formulation before its polymerization.

It is desirable, to provide effective antiviral and antibacterial, disinfecting, agents and compounds to materials used in PPE in a manner that is efficient, cost effective and usable in both a manufacturing and field environment.

SUMMARY OF THE INVENTION

This invention overcomes disadvantages of the prior art by providing a system and method for impregnating surfaces, which are typically porous and/or textile-based, with antiviral/antibacterial compounds in a manner that is robust, effective and straightforward. Such techniques can be employed during manufacture of the underlying item (e.g. PPE) and/or in the field. In an illustrative embodiment, a system and method for providing antiviral and antibacterial properties to a porous surface is provided. It includes a suspension consisting of a water-based solvent and an active ingredient consisting of at least one of a nanoparticulate metal and a chelated metal. The suspension is applied using an application process that is arranged to immerse or spray the suspension relative to the surface. Illustratively, the metal is at least one of silver, copper and titanium. Alternatively, or additionally, the metal can a chelated copper. The suspension can also include a salt component, such as sodium chloride. Additionally, the suspension can include a Silicon based compounds with high wetting properties and stable in a pH range between 2 and 7. Additionally, the suspensions can includes citric acid (to an approximately pH in the range of 2.5-3). Additionally, the suspension can includes 5%-10% of alcohol. The nanoparticulate material can be generated using a cold plasma generator through which the suspension is passed. Additionally, the porous surface can be at least part of a PPE item or healthcare equipment item.

In an illustrative embodiment, a system and method for providing antiviral and antibacterial properties of 60 days or more to a porous surface is provided. The system and method includes a suspension that consists of a water-based solvent and at least one active ingredient consisting of at least one of a nanoparticulate metal and a chelated metal. An application process is arranged to immerse or spray the suspension relative to a hydrophobic surface by combining a silicon-based compound with strong wetting and binding properties. The application process can include either (a) immersing or (b) spraying-on the suspension relative to the hydrophobic surface, in which the alcohol is provided to the surface in advance or as part of the suspension. Illustratively, the metal is at least one of metallic silver, copper and titanium and/or a chelated copper. The suspension can further include a salt component, such as iodine and sodium chloride. In various embodiments (e.g. for use with hydrophobic materials) the suspension includes a silicon-based compound with strong wetting and binding properties. The silicon-based compound can be provided to the suspension in a concentration of approximately 5% to approximately 10%. In various embodiments (e.g. for use with hydrophilic materials) the alcohol can be provided to the suspension in a concentration of approximately 10% to approximately 60%. Illustratively, the nanoparticulate material can be generated using a cold plasma generator through which the suspension is passed. In embodiments, the active ingredient can comprise copper in concentrations of approximately 0.005% to approximately 0.2%; and/or silver in concentrations of approximately 0.005% to approximately 0.2%. The suspension can define a pH of approximately 2.0 to approximately 4.0 (acidic). The suspension can further comprise titanium, sodium, and iodine in a total concentrations of up to 0.0001%.

In an illustrative embodiment, a method for providing antiviral and antibacterial properties to a surface of an item is provided. It includes providing a liquid suspension consisting of a water-based solvent and an active ingredient consisting of at least one of a nanoparticulate metal and a chelated metal, wherein the metal is at least one of silver, copper, and titanium. The method further includes immersing or spraying the suspension relative to the surface, including (a) providing to the suspension a silicon-based compound for application on o hydrophobic surfaces, or (b) providing to the suspension alcohol for application on hydrophilic surfaces. Illustratively, the metal can be a chelated copper and nanoparticles of copper. The step of immersing or spraying can further comprise applying the suspension to at least part of a PPE item or healthcare equipment item. Additionally, the step of immersing or spraying can be repeated at a frequency based upon at least one of (a) presence of tested bacterial buildup on the surface and (b) completion of a laundering step on the PPE. The application (spraying or immersing) frequency can be controlled, in part, based upon presence of the silicon-based compound in the suspension.

In an illustrative embodiment, a suspension that impregnates a porous surface with antiviral and antibacterial properties is made by a process that includes (a) providing a water solution with a salt; (b) passing the water solution through a cold plasma chamber that generates ions and nanoparticles of a metal separately for each metal; (c) allowing the water solution to cool and removing sediments therefrom; (e) concentrating metals in suspensions separately; (f) mixing the concentrated suspensions of metals; and (g) providing the suspension resulting from steps (a)-(f) to a vessel for mixing with (i) silicon-based compounds for application to hydrophobic surfaces and (ii) alcohol for application to hydrophilic surfaces prior to application to the surface. Illustratively, the metal is copper, silver and/or titanium.

BRIEF DESCRIPTION OF THE DRAWINGS

The invention description below refers to the accompanying drawings, of which.

DETAILED DESCRIPTION

I. Overview

A system and method for impregnating porous materials, such as the textiles used to construct PPE—e.g., masks, gloves, gowns, scrubs, protective suits, etc.—is described herein. In general, the system and method allows such equipment to be treated after manufacture, and before use. A liquid suspension of antiviral/antibacterial (disinfecting) compound(s) is applied to the surface of the PPE material and other associated surfaces—for example a plastic surface used in a health care environment. This suspension, when dried, provided a continuing resistance to biological contamination and/or infectious disease in a manner that does not harm or otherwise cause discomfort to the wearer.

A. Properties of Disinfecting Compound(s) Impregnated by the Suspension

A plurality of properties are ascribed to the compound(s) used according to the system and method. These include depressing the growth of microbes, viruses and fungus on dry and wet surface of PPE material and/or surface of plastic in healthcare environment; and in a short time interval after application, inactivating viruses and microbes that settle on a dry surface of PPE material and/or the surface of plastic equipment/furniture in health care environment. Additionally, the impregnated compound(s) allows reuse of disinfected PPE (and/or other equipment) indefinitely in a manner that is free of re-sterilization. The compound(s) can be re-applied to materials on a repetitive basis whilst the underlying items/equipment are otherwise free of re-sterilization. Notably, the impregnated compound(s) effectively prevent secondary contamination/infection by user of PPE by microbes and viruses, which occur on surface of the PPE through touching or breathing of viruses/biological material; and also prevent contamination/infection by third parties through contact with infected PPE due to the high degree of inactivation that the compound(s) provide on the associated PPE. Notably, the PPE can, in many instances, be recycled and reused (instead of discarding) by washing or laundering the PPE within the suspension of compound(s).

B. Impregnated Plastic Surface in Healthcare Environment

As described above, the properties of the suspension and compound(s) make it suitable for use on plastic equipment (PPE and other) in a healthcare environment. This is because the compound(s) are generally safe to touch while preventing contamination/infections by viruses, microbes or fungus. Such compound(s) are designed to retain their effectiveness over their life of application to the surface.

These surfaces treated with the compound(s) herein can be cleaned using water (and water-based cleaners) in a manner that is substantially free of loss of the underlying/antibacterial and/or antiviral properties. The nature of the compound(s) microstructure also facilitates lifetime disinfection on a plastic surface, assuming the porosity (pore density and pore size) of the material is sufficient accommodate the compound in an impregnated form.

II. Compound(s) Employed.

Figure 1:
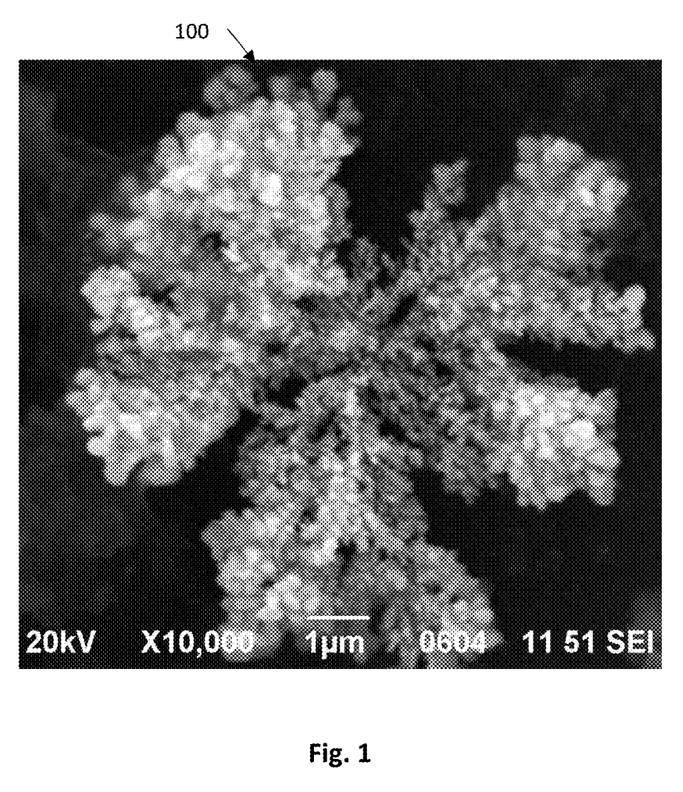
FIG. 1 is a magnified image of a nanoparticle of silver generated in cold plasma environment, for use in the illustrative antiviral/antibacterial suspension according to an embodiment of the present invention.

The illustrative suspension employs an active antiviral/antibacterial agent that can be drawn from a list of possible chemical species, including, but not limited to, copper, silver (optional), titanium, chlorine, sodium and water. More particularly, suspensions used for porous surface impregnation in accordance with this invention can include a mix of chelated copper doped by silver, sodium, titanium and following ligands —$H_2O$, OH—, Cl—, I—, $CO_2$— and nanoparticles of copper, as well as copper-silver alloy. Chelated molecules can be combined in different combination and shape in flocks. With reference to FIG. 1 the exemplary nanoparticle 100 for use in the suspension according to one or more embodiments is shown at high magnification. Note that the nanoparticle 100 defines a highly developed surface, and is surrounded by molecules of water as ligand. Molecules of water herein are chemically bonded with the nanoparticles (of metals) in manner that maintains a connection between compounds even in dry conditions. The exemplary nanoparticle(s) can vary in size from approximately 10 nanometers to 330 nanometers, with maximum number of nanoparticles residing in a size range between approximately 30 and 90 nanometers.

In operation, the active ingredient of the suspension exhibits a strong oxidation effect in wet and dry environment—for example, acting to block at least some biochemical processes essential for cell biology; and blocking replication of nucleic acids of viruses, bacteria, etc.

A. Copper as an Active Ingredient

It is contemplated that copper, in various forms, can be employed as a relative inexpensive, metal, active ingredient according to various embodiments. Thus, according to an illustrative embodiment, the suspension is provided in a concentration of approximately 2,000-3,000 mg/liter, and can include chelated copper and/or copper nanoparticles. Notably, chelated copper, as well as nanoparticles of copper, are able to inactivate viruses and microbes (e.g. bacteria) in a dry and/or water suspension environment. Chelated copper and nanoparticles exhibit similar abilities (performance) to inactivate viruses and bacteria as nanoparticles of silver. However, copper is significantly lower in cost than silver, making it more suitable for mass-production and deployment. Chelated copper doped by sodium, silver, titanium, zinc, and/or with ligands $H_2O$, OH—, Cl—, I—, $CO_2$— which enhances the strength and performance of the overall combination of active ingredients when compared with nanoparticles of copper exclusively. Moreover, chelated copper is safe for human use and exposure/consumption. This is because copper is biologically active species in the human body, and involved in many biochemical process. Hence, copper in the various forms contemplated herein is essentially transparent which make copper "invisible" for leaving membrane of bacteria, for instance and easy pass through cells protection barriers. The specific biological operating mechanism for chelated copper and copper nanoparticles is not currently not well understood. Some published data indicate that copper readily connects with specific organic molecules of cells and blocks key biochemical processes of cells. It is recognized that ligands can also damage cells and nucleic acids of viruses and bacteria by oxidation.

B. Copper With Silver Using Alcohol

It is also contemplated that copper and silver can both be employed as metal, active ingredients in various embodiments. As described below, the illustrative embodiment includes both copper and silver, however, it is specifically contemplated that various embodiments can include copper, silver, or both copper and silver. In embodiments that include both copper and silver, the concentrations of copper and silver can be the approximately the same, or the concentrations of the two can be different. As described below, an illustrative embodiment can include isopropanol and citric acid, however, it should be clear to one skilled in the art that one or more various alcohols and/or one or more various acids could be used. Although the following examples describe the use of isopropanol and citric acid for the sake of clarity, one skilled in the art will understand that various alcohols and/or acids can be used. In general, it can be desirable to provide a silica-based compound (or equivalent) with strong wetting and bonding properties, and such should be mixed into the suspension contemplated herein before application.

According to an illustrative embodiment, a disinfecting compound can include copper in concentrations ranging from approximately 0.005% to approximately 0.2% (w/w) and silver in concentrations ranging from approximately 0.005% to approximately 0.2% (w/w), along with water in concentrations ranging from approximately 40% to approximately 90% (w/w), an alcohol such as isopropanol (or other equivalent alcohol/solvent) in concentrations ranging from approximately 10% to approximately 60% (w/w), and an acid such as citric acid (or another equivalent acid/reagent) in concentrations sufficient for lowering the acidity of the compound up to pH 3.5, and titanium, sodium, and iodine in concentrations of up to approximately 0.0001% (w/w) in total. The active ingredients can include isopropanol, citric acid, and chelated molecules and nanoparticles of copper and solver doped by titanium, sodium, and iodine. Note that the addition of an acid herein serves to correct pH and also prevents nanoparticles from undergoing oxidation, which would result in a loss of activity. In general, reducing pH to a range of approximately 5.0-2.5 can achieve these results.

This exemplary embodiment of a disinfecting solution can be used for application on materials with a hydrophobic surface, such as air filters, as well as materials with hydrophilic surfaces, such as textiles or metals which can be cleaned with water. This solution can be used to uniformly cover up to 100% of a surface area with active ingredients. Virus killing rates can be up to log 5, or stated differently, can be up to 99.999% effective, immediately after application, and can be up to log 3, or 99.9% effectiveness, for up to approximately 60 days of longevity on the item after the water and alcohol (e.g. isopropanol, etc.) have evaporated without the need to apply disinfectant a second time. The solution can continue to grant disinfecting properties to a surface even after the surface is cleaned or washed occasionally.

This disinfecting solution can be applied to a surface a single time, and can continue provide antibacterial and antiviral properties to that surface for at least 60 days after application. The solution can be applied to hydrophobic and hydrophilic surface, and can be applied to the surface by any known method. The solution can also be sprayed onto hydrophilic or hydrophobic surfaces multiple times to increase the density of copper and silver active ingredients. Spraying multiple times to increase the density of copper and silver active ingredients on the surface can increase the killing rate up to log 4, or 99.99% effectiveness, even after the water and alcohol have dried. The log 4 kill rate over 60 days or more can be due to a combination of alcohol, acid (e.g. citric acid, etc.), chelated molecules and nanoparticles of copper, including combinations of $Cu^+$ and $Cu^+$, and silver doped by titanium, sodium and iodine as active ingredients. Active ingredients such as chelated molecules and nanoparticles of $Cu^+$ and $Cu^{++}$, and silver, doped by titanium, sodium, and iodine are active and effective in both wet and dry environments.

The active ingredients in the compound can create an environment that allows high electron-proton conductivity in a dry environment, resulting in higher kill rates than previously known disinfectants. The chelated molecules of copper with valence $Cu^+$ and $Cu^+$ doped by titanium, sodium, and iodine, in an acidic environment can create an environment that allows electron-proton conductivity in dry conditions resulting in increased antiviral activities of the compound. The alcohol can provide strong antiviral and antibacterial properties, but can also lower the surface tension of the compound. This reduced surface tension can result in the compound more effectively covering 100% of the surface of materials, including surfaces with hydrophobic as well as hydrophilic properties. The alcohol in combination with acid can result in high concentrations of chelated molecules of $Cu^+$ and $Cu^+$, can reduce the size of nanoparticles of coper and silver, prevent nanoparticles of copper and silver from oxidizing quickly, and can create conditions for electron-proton conductivity in dry environment and reinforce antiviral and antibacterial activity in a wet environment.

Figure 2:
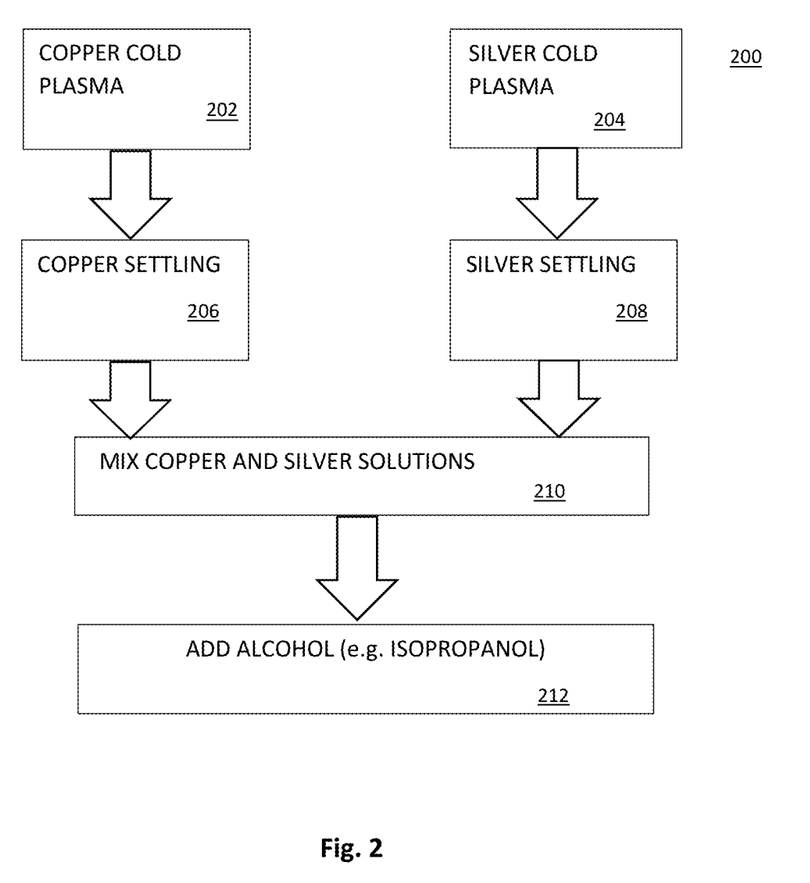
FIG. 2 is a flow diagram of an exemplary process for mixing a suspension for use as an antiviral/antibacterial coating on hydrophilic surfaces.

In an embodiment, the exemplary compound can be created according to the process 200 shown in FIG. 2. At box 202, the process 200 can include a first aqueous solution of acid and iodine salt in distilled water with a pH of between approximately 2.0 and approximately 4.0, using cold plasma with titanium electrodes on media of copper in continuously flowing water for approximately 30-60 minutes. At box 204, the process can include a second aqueous solution of acid and iodine salt in distilled water with a pH of approximately 2.0 and approximately 4.0, using cold plasma with titanium electrodes on silver media. At box 206, the copper suspension from box 202 is allowed to settle for approximately 8-12 hours so that the sediment settles under gravity, and at box 208, the silver suspension from box 204 is allowed to settle for approximately 8-12 hours so that the sediment settles under gravity. At box 210, the copper suspension is mixed with the silver suspension, and at box 212 alcohol is added to the copper-silver suspension to approximately 10-60% (w/w) of alcohol to copper-silver suspension, and mixed.

C. Copper With Silver Using Silicon

It is contemplated that copper and silver can both be employed as metal, active ingredients in various embodiments. As described below, the illustrative embodiment includes both copper and silver, however, it is specifically contemplated that various embodiments can include copper, silver, or both copper and silver. In embodiments that include both copper and silver, the concentrations of copper and silver can be the approximately the same, or the concentrations of the two can be different. Note, it has been recognized that, in various implementations, copper can provide a relatively equivalent antiviral/antibacterial effect versus a copper-silver mixture.

As described below, an illustrative embodiment can include citric acid, however, it should be clear to one skilled in the art that one or more various acids could be used. Although the following examples describe the use of citric acid for the sake of clarity, one skilled in the art will understand that various acids can be used.

According to an illustrative embodiment, a disinfecting compound can include copper in concentrations ranging from approximately 0.005% to approximately 0.2% (w/w) and silver in concentrations ranging from approximately 0.005% to approximately 0.2% (w/w), along with water in concentrations ranging from approximately 40% to approximately 90%, silicon based compound in concentrations ranging from approximately 5% to approximately 10%, and acid in concentrations sufficient for lowering the acidity of the compound to a maximum of approximately pH 2.5, and titanium, sodium, and iodine in concentrations of up to 0.0001% (w/w) in total. The active ingredients can include acid, (e.g.) silicon-based compound with wetting and bonding properties, chelated molecules and nanoparticles of copper and silver doped by titanium, sodium and iodine.

This exemplary embodiment of a disinfecting solution can be used for application on materials with hydrophilic surfaces, such as textiles, which can be cleaned with water. The solution can be applied uniformly to various surfaces, and can result in binding of active ingredients to the surface, including chelated molecules and nanoparticles of copper and silver doped by titanium and sodium. The compound can result in virus killing rates up to log 4 immediately after application, and can maintain killing rates of up to log 3 for at least 60 days after water evaporation without the need to apply disinfectant a second time. The solution can continue to grant disinfecting properties to a surface even after the surface is cleaned or washed occasionally.

This disinfecting solution can be applied to a surface a single time, and can continue provide antibacterial and antiviral properties to that surface for at least 60 days after application. The solution can be applied to hydrophilic surfaces by any known method. The solution includes active ingredients that are active in a wet environment, including silicon-based compound with wetting and binding properties, and acid, and active ingredients that are effective in both wet and dry environments including chelated molecules and nanoparticles of $Cu^+$ and $Cu^+$, and silver, doped by titanium, sodium, and iodine. The compound has high antiviral and antibacterial properties in both wet environments and dry environments due to the various active ingredients. The silicon based compound can help to uniformly distribute the active ingredients over 100% of the applied surface area, and can also bind active ingredients to the surfaces, preventing the active ingredients from washing out from the applied surfaces during occasional washing or cleaning. This exemplary compound can create a better environment for high electron-proton conductivity in a dry environment, and better kill rates in a dry environment, than other previously known disinfecting compounds. The chelated molecules of copper with valence $Cu^+$ and $Cu^+$ doped by titanium, sodium, and iodine, in an acidic environment can create an environment that allows electron-proton conductivity in dry conditions resulting in increased antiviral activities of the compound. The silicon based water repellent in combination with citric acid can result in high concentrations of chelated molecules of $Cu^+$ and $Cu^{++}$, can reduce the size of nanoparticles of copper and silver, prevent nanoparticles of copper and silver from oxidizing quickly, and can create conditions for electron-proton conductivity in dry environment and reinforce antiviral and antibacterial activity in a wet environment.

Figure 3:
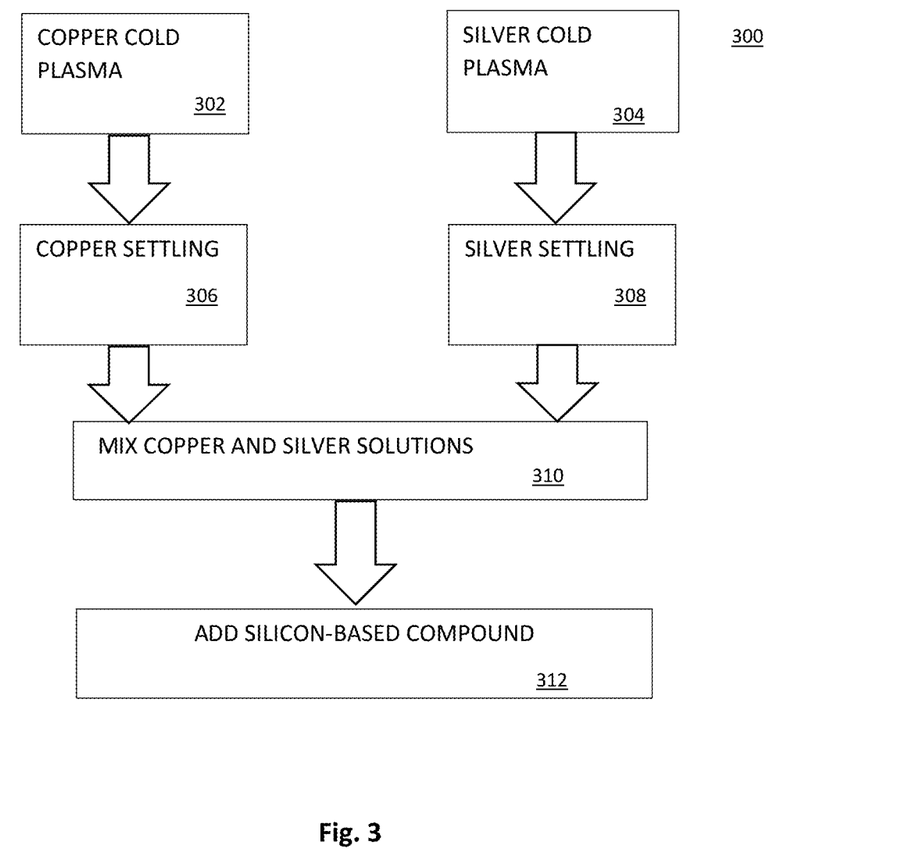
FIG. 3 is a flow diagram of an exemplary process for mixing a suspension for use as an antiviral/antibacterial coating on hydrophobic surfaces.

In an embodiment, the exemplary compound can be created according to the process 300 shown in FIG. 3. At box 302, the process 300 can include a first aqueous solution of citric acid and iodine salt in distilled water with a pH of between approximately 2.0 and approximately 4.0, using cold plasma with titanium electrodes on media of copper in continuously flowing water for approximately 30-60 minutes. At box 304, the process can include a second aqueous solution of citric acid and iodine salt in distilled water with a pH of approximately 2.0 and approximately 4.0, using cold plasma with titanium electrodes on silver media. At box 306, the copper suspension from box 302 is allowed to settle for approximately 8-12 hours so that the sediment settles under gravity, and at box 308, the silver suspension from box 204 is allowed to settle for approximately 8-12 hours so that the sediment settles under gravity. At box 310, the copper suspension is mixed with the silver suspension, and a silicon-based compound is added to the copper-silver suspension to approximately 5-10% (w/w) of silicon based compound to a copper-silver suspension, and mixed before application to items.

D. Suspension Shelf Life

It is noted that the chemical compounds used in the suspension afford it an indefinite, and potentially unlimited shelf life under normal temperature, pressure and humidity conditions, in sealed containers. Such containers can be constructed (e.g.) from chemically inert plastic or glass and in a generally sunlight/uv-free environment. In general, the suspension is provided in liquid form to end-users. However, in alternate implementation, it can be provided in dry form for addition of appropriate solvent(s) by an end user when ready for use—for example clean (e.g. filtered) tap water, distilled water or deionized water.

III. Usage of the Suspension

The use of the suspension according to an exemplary implementation herein entails impregnation molecules of active agent into material of PPE by employing passage of the liquid suspension through material as if it was a filtration media. The more molecules that are impregnated on the PPE material, the higher self-sterilization properties of the material will be. Once treated, the PPE can be dried by exposure to air, or to accelerate the process, through application of heat (via radiation and/or air convection). Where used, drying equipment should operate at under a temperature of approximately 80° F. to 150° F.

A. Impregnation of a Textile of New PPE or After Laundering

Figure 4:
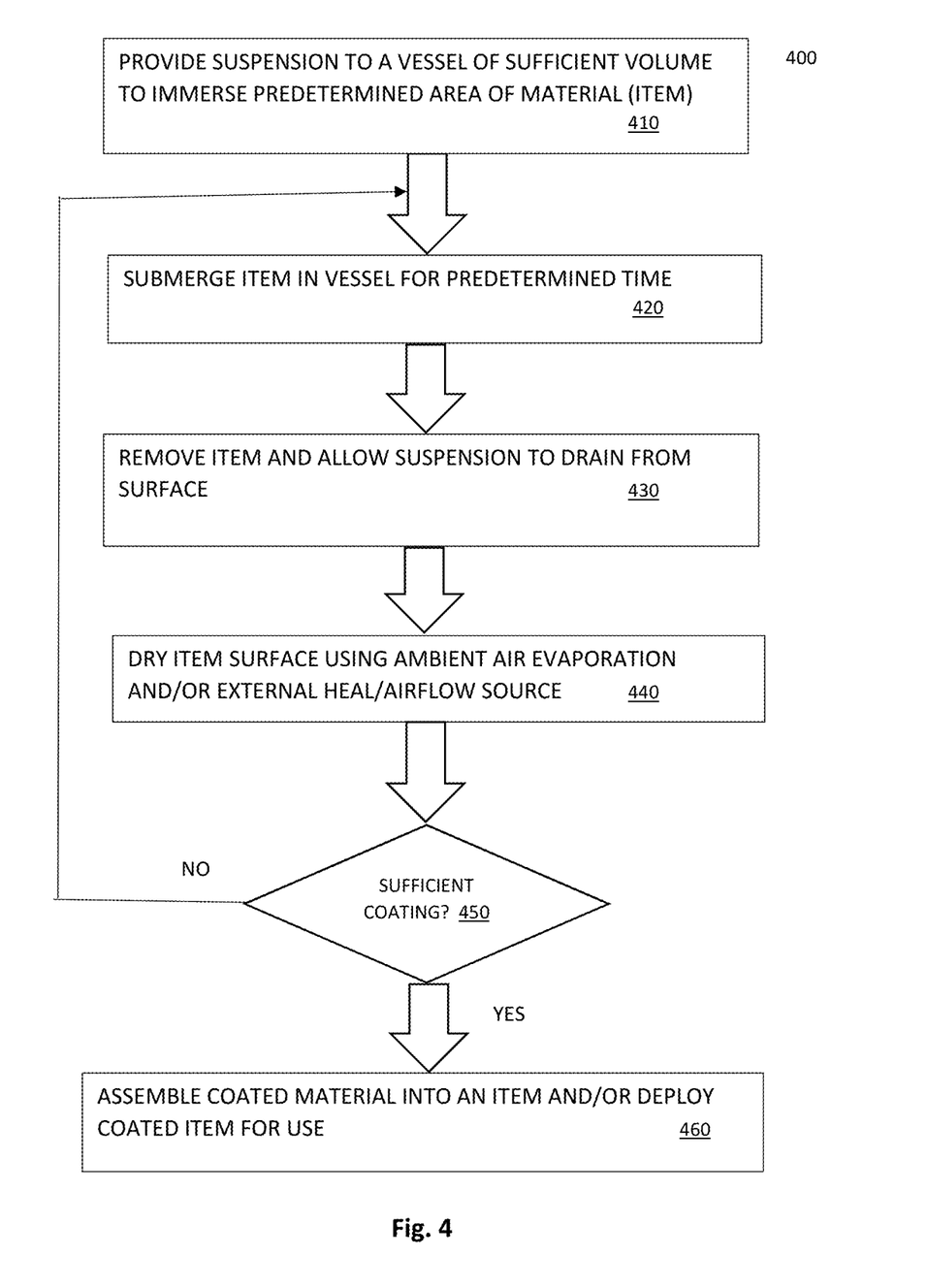
FIG. 4 is a flow diagram showing an exemplary procedure for impregnating an item with a suspension, according to the embodiments herein, via immersion in a vessel.

With reference to the process 400 in FIG. 4, where the PPE is a textile material, it can be impregnated with the suspension in accordance with this system and method (either in new form, or after laundering) in accordance with the following steps:

1. Provide suspension in a concentration of copper in range 2,000-3,000 mg/1, in a sufficient volume to allow textile-based PPE (face masks, protective garments/suits, smocks, medical clothing, etc.) to be submerged for impregnation. An appropriate vessel is provided (e.g. a tub, tray, etc.) depending upon the number of items submerged, their form factor, etc. (step 410).

2. The dry textile PPE is then submerged in the suspension and remains submerged for (e.g.) approximately 15-30 minutes (step 420).

3. The PPE items are then removed from the vessel and allowed to drain excess liquid therefrom—potentially back into the vessel or to another waste-disposal location. The drained, waste liquid can be reused as appropriate, or discarded (step 430).

4. The treated, moist PPE items are then (optionally) dried using drying equipment (and/or ambient air drying) as described above (step 440).

While a single coating using this immersion process is typically sufficient to provide the desired protective characteristics/performance, in some implementations, it may be desirable to provide additional coatings to the item, either directly after a first coting or after a predetermined time period (hours, days, etc.). If so, the process 400 allows for (via decision step 450) further coatings (steps 420-440) until sufficient coatings are applied to the item and then it is ready to be assembled into an overall item (e.g. a PPE garment or equipment) or for deployment as a completed piece of PPE (step 460). Note the same or a different vessel can be used depending upon timing and the amount a suspension remaining therein. Given a large vat, there may be sufficient suspension for multiple coatings and/or a mechanism to maintain predetermined level in the vessel.

B. Impregnation of a Porous Plastic Surface

The process for impregnating the suspension into porous plastic (polymer) items—for example healthcare equipment, furniture, etc. is somewhat similar to the above-described textile-based process. The process 500 is shown in overview in FIG. 5.

Figure 5:
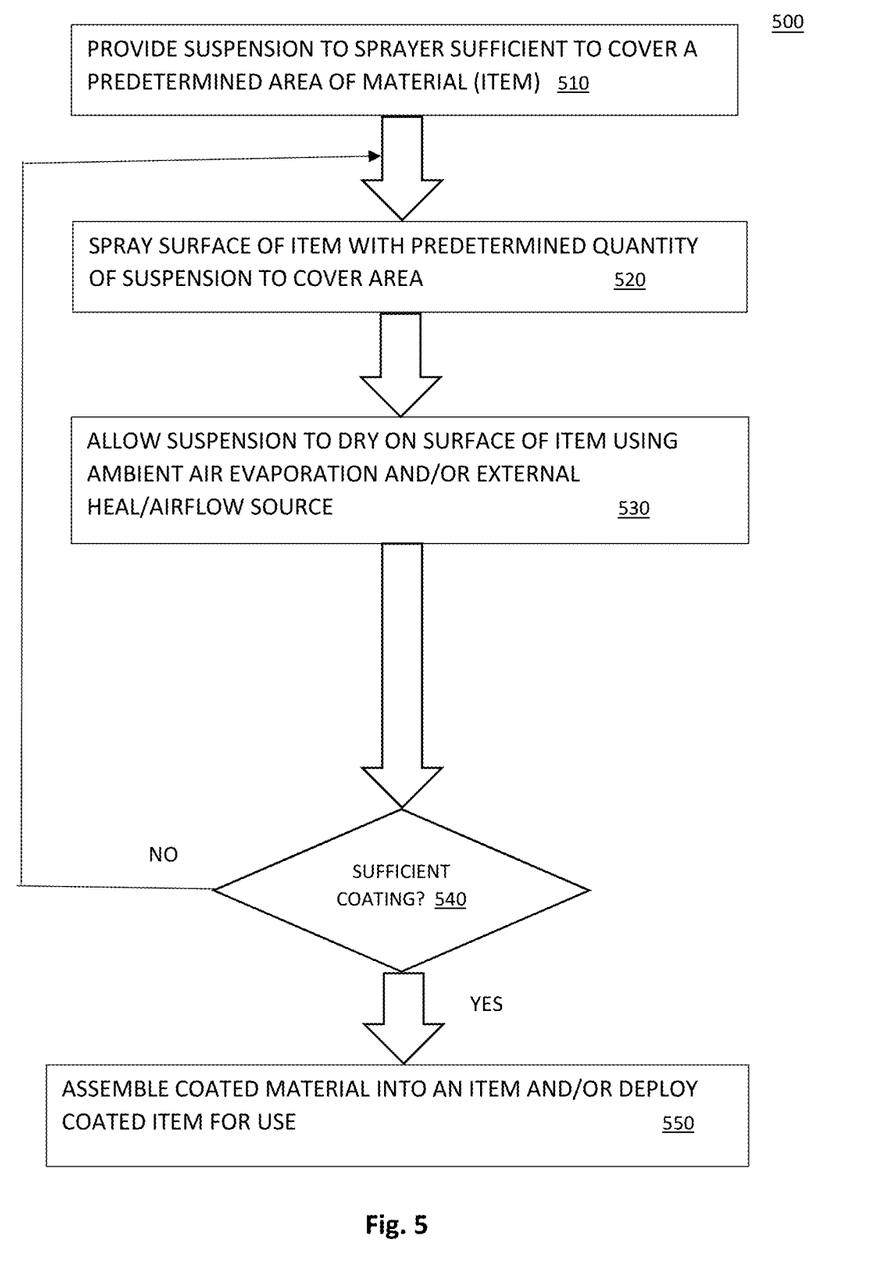
FIG. 5 is a flow diagram showing an exemplary procedure for coating an item with a suspension, according to the embodiments herein, via spray application.

1. The suspension is provided with a concentration of copper compound(s) of between approximately 2,000-3,000 mg/l. The reservoir of a sprayer (manual spray bottle, spray gun, etc. is filled with the suspension so that it can be delivered through the spray nozzle and fill in equipment for spraying of suspension (step 510).

2. The suspension is then sprayed onto the surface with appropriate control (step 520).

3. The surface is allowed to dry via air exposure or with the aid of a convection/radiation heat source operating at temperatures described above (and otherwise less than that capable of melting the plastic or damaging the active ingredients (step 430).

4. After initial drying, the item is typically sprayed with a second coat (and/or additional coats as desired and deemed sufficient) of the suspension and allowed to dry as described above (decision step 540 and steps 520-530).

5. Further coats of suspension and interim drying cycles can be undertaken until the item is sufficiently coated.

IV. Method of Suspension Preparation

The suspension according to various exemplary implementations and/or formulations herein can be prepared according the following process:

1. Appropriately clean and pure water is measured out in the required volume. Such water can be clean (e.g. filtered) tap water, distilled water, deionized water, etc.

2. Sodium chloride is added to the measured-out water in an approximate concentration of 5-10 grams per gallon.

3. The added sodium chloride is allowed to dissolve by mixing or other appropriate agitation.

4. The mixed sodium chloride suspension is then passed (cycled) through a limited volume chamber that provides a cold plasma environment for 15 minutes in a continuous flow mode. The cold plasma employs an impulse generator operating between approximately 500 and 5000 VDC. It can use metallic electrode(s) composed of the desired active ingredient metal—for example copper, silver (up to 15% from copper mass) and/or titanium electrodes. The cold plasma generates active radicals and ions from the electrode material, based upon prevailing high pressure, high temperature, ultraviolet waves etc. that occur during the generator's heat up phase (of the generation cycle). Those active radicals and ions are combined into complex molecules during generator's cooling phase and resulting bubbles in the liquid collapse to include the molecules.

5. The cold-plasma exposed suspension is allowed to settle for approximately 30 minutes.

6. Then, any sediments are separated from the suspension using known techniques.

7. The suspension is then stored for subsequent use in an appropriate container or used directly on the porous surface (s) of items which require impregnation for disinfection and antiviral/antibacterial properties.

8. Optionally, the suspension can dilute (be combined with) a water-repellent active ingredient, such as sodium aluminomethyl siliconate. For example, the associated dilution factor is approximately 60-90% for chelated copper and nanoparticles suspension and approximately 10-40% for water repellent.

V. Repeated Usage of the Suspension on Items

As described above, the suspension can be applied repetitively to various items and surfaces depending upon material type, usage and frequency of cleaning/laundering. In the use case of a textile PPE impregnated chelated copper suspension without (free of) added water repellent, then the suspension should be reapplied, in the manner described above, following each laundering of the item. In the use case of a textile PPE impregnated by chelated copper suspension that is also combined with a water repellent, the item(s) can typically be re-impregnated after between 3 and 5 launderings—since the water repellent assists in maintaining the impregnated material within the pores of the fabric against the solvent action of the laundry water and detergent.

In the use case of a porous plastic surface, the application of the suspension to impregnate the material can be repeated as needed depending upon the results of microbiological tests on the plastic surface. If the test determines that bacteria are present on the surface (based upon known analytic techniques), then the application of the suspension can be repeated as described above.

VI. Conclusion

It should be clear that the above-described system and method provides a straightforward, cost-effective, non-toxic and relatively long-lasting solution to the problem of preventing viral and bacterial contamination of textiles and other porous surfaces. The materials used are readily available and the associated suspension can be manufactured with minimal equipment or resources. The associated suspension is easily applied using a variety of mechanisms and techniques and allows for immediate or subsequent reapplication to the surface of the underlying item (e.g. PPE garments and equipment) to maintain or enhance antiviral/antibacterial effectiveness. Moreover the suspension allows for repeated item/equipment cleaning cycles after application without (free-of) losing significant effectiveness/performance.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for providing antiviral and antibacterial properties of 60 days or more to a porous surface comprising:
   a suspension that employs an active antiviral/antibacterial agent, the suspension consisting of;
   copper in a concentration of 0.005% to 0.2% (w/w) comprising at least one of:
   chelated copper doped by one or more of silver, sodium, titanium, or zinc; or
   nanoparticles of copper defined by a highly developed surface and surrounded by molecules of water that are chemically bonded with the nanoparticles that vary in size from 30-90 nanometers;
   sodium chloride in a concentration of 5-10 grams per gallon;
   water in a concentration of 40% to 90% (w/w); and
   acid in a concentration that causes suspension pH to be in a range of pH 3.5-2.5;
   a first combined suspension comprising the suspension, silver in a concentration of 0.005% to 0.2% (w/w), a first combination of titanium, sodium, and iodine, the first combination in total concentration of 0.0001% (w/w), and alcohol in a concentration of 10% to 60% (w/w);
   a second combined suspension comprising the suspension, silver in a concentration of 0.005% to 0.2% (w/w), a second combination of titanium, sodium, and iodine, the second combination in total concentration of 0.0001% (w/w), and a silicon-based compound with strong wetting and binding properties in a concentration of 5% to 10%;
   a first application system by which the first combined suspension is applied to a hydrophilic application item via immersion; and
   a second application system by which the second combined suspension is sprayed-on relative to a hydrophobic surface of a hydrophobic application item.

2. The system as set forth in claim 1 further comprising a cold plasma generator through which the suspension is passed.

3. The system as set forth in claim 1 further including a diluted suspension comprising the first combined suspension at a concentration of 60%-90% and a water-repellent active ingredient of 10%-40%.

4. The system as set forth in claim 1 further including a diluted suspension comprising the second combined suspension at a concentration of 60%-90% and a water-repellent active ingredient of 10%-40%.

5. A system for providing antiviral and antibacterial properties of 60 days or more to a porous surface comprising:
   a suspension consisting of;
   copper in a concentration of 0.005% to 0.2% (w/w) comprising at least one of:
   chelated copper doped by silver, sodium, titanium, or zinc; or
   nanoparticles of copper that define a highly developed surface and surrounded by molecules of water that are chemically bonded with the nanoparticles that vary in size from 30-90 nanometers;
   silver in a concentration of 0.005% to 0.2% (w/w);
   a first combination of titanium, sodium, and iodine, the first combination in total concentration of 0.0001% (w/w);
   sodium chloride in a concentration of 5-10 grams per gallon;
   water in a concentration of 40% to 90% (w/w); and
   acid in a concentration that causes suspension pH to be in a range of pH 3.5-2.5; and
   a suspension applicator comprising one of an immersion vessel or a sprayer.

6. The system as set forth in claim 5 further comprising a first combined suspension consisting of the suspension and alcohol in a concentration of 10% to 60% (w/w).

7. The system as set forth in claim 6 wherein the suspension applicator comprises an immersion vessel by which the first combined suspension is applied to an application item.

8. The system as set forth in claim 5 further comprising a second combined suspension consisting of the suspension and a silicon-based compound with strong wetting and binding properties in a concentration of 5% to 10%.

9. The system as set forth in claim 8 wherein the suspension applicator comprises a sprayer by which the second combined suspension is applied to an application item.

10. A system for providing antiviral and antibacterial properties of 60 days or more to a porous surface comprising:
    a suspension consisting of;
    copper in a concentration of 0.005% to 0.2% (w/w) comprising at least one of:
    chelated copper doped by silver, sodium, titanium, or zinc; or
    nanoparticles of copper that define a highly developed surface and surrounded by molecules of water that are chemically bonded with the nanoparticles that vary in size from 30-90 nanometers;
    silver in a concentration of 0.005% to 0.2% (w/w);
    a first combination of titanium, sodium, and iodine, the first combination in total concentration of 0.0001% (w/w);
    sodium chloride in a concentration of 5-10 grams per gallon;
    water in a concentration of 40% to 90% (w/w);
    acid in a concentration that causes suspension pH to be in a range of pH 3.5-2.5; and
    a target application component selected from a list of application components consisting of:

a hydrophilic-based target application component of alcohol in a concentration of 10% to 60% (w/w); or a hydrophobic-based target application component of a silicon-based compound with strong wetting and binding properties in a concentration of 5% to 10%; and a suspension applicator comprising one of an immersion vessel or a sprayer.

11. The system of claim 10, wherein the target application component is hydrophilic-based and the suspension applicator is an immersion vessel.

12. The system of claim 10, wherein the target application component is hydrophobic-based and the suspension applicator is a sprayer.

* * * * *